Aug. 17, 1965  G. W. JACKSON  3,200,843
VALVE FOR VEHICLE SUSPENSION SYSTEM
Original Filed Sept. 12, 1960  2 Sheets-Sheet 1

INVENTOR.
George W. Jackson
BY
D. C. Staley
HIS ATTORNEY

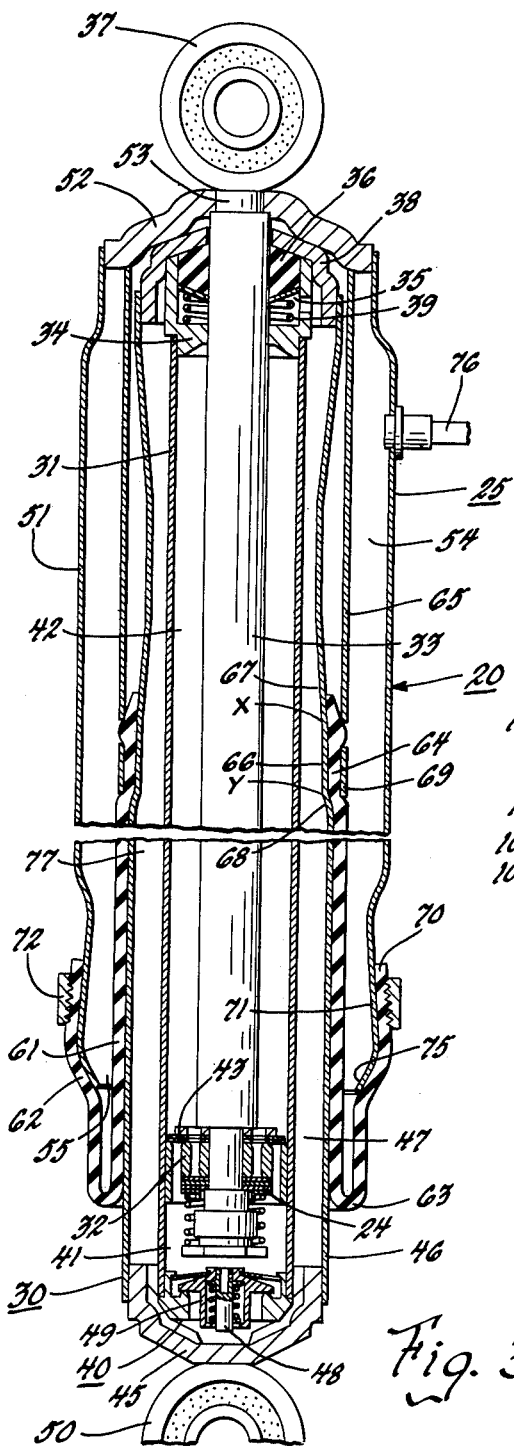
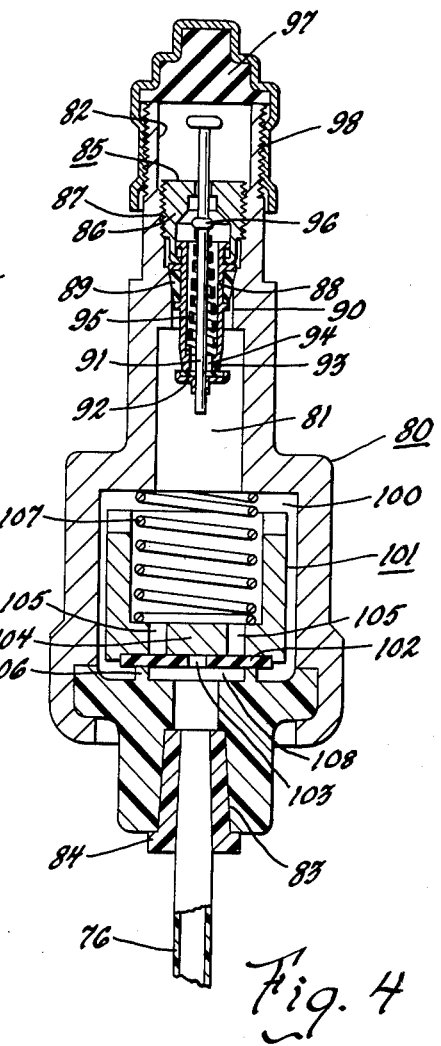
Fig. 3
Fig. 4
INVENTOR.
George W. Jackson
BY
D. C. Staley
HIS ATTORNEY

United States Patent Office 3,200,843
Patented Aug. 17, 1965

3,200,843
VALVE FOR VEHICLE SUSPENSION SYSTEM
George W. Jackson, Dayton, Ohio, assignor to General Motors Corporation, Detroit, Mich., a corporation of Delaware
Original application Sept. 12, 1960, Ser. No. 55,359. Divided and this application Jan. 26, 1962, Ser. No. 169,052
3 Claims. (Cl. 137—614.19)

This invention relates to an automotive vehicle suspension system incorporating a combination shock absorber and supplementary air spring unit assembly that is adapted to be placed between the sprung mass and the unsprung mass of a vehicle adjacent the main suspension spring for the vehicle that is also placed between the sprung mass and the unsprung mass of the vehicle with the combination shock absorber and supplementary air spring unit assembly being disposed in the same position normally occupied by a conventional direct-acting tubular type shock absorber so that when the supplementary air spring unit is pressurized with a suitable fluid under pressure, such as air, the supplementary air spring unit will aid the main suspension spring in support of the sprung mass of the vehicle on the unsprung mass.

This application is a division of Serial No. 55,359 filed September 12, 1960, now abandoned.

The main suspension springs for the vehicle are engineered to provide the desired suspension normally provided between the sprung mass and the unsprung mass of a vehicle, the main suspension springs being engineered to give the ride effect desird in th vehicle. Normally a direct-acting tubular type shock absorber is positioned between the sprung mass and the unsprung mass of the vehicle adjacent the main suspension spring to damp movements between the sprung mass and the unsprung mass of the vehicle.

In this invention a direct-acting tubular type shock absorber is provided with a supplementary air spring unit which forms with the shock absorber an assembly that is adapted to be placed between the sprung mass and the unsprung mass of the vehicle in the same position normally occupied by the conventional direct-acting tubular type shock absorber. The supplementary air spring unit is adapted to be operated either in a deflated condition or in an inflated condition depending upon whether or not supplementary or aiding support is required between the sprung mass and the unsprung mass of the vehicle to maintain the vehicle in a level condition relative to the road, depending upon the load carried in the vehicle.

Under all normal operating conditions the vehicle is designed to carry an average load condition of passengers and baggage, but even under these conditions there are times when the passenger load and the baggage load becomes heavy so that the rear end of the vehicle tends to sag. Under these conditions, or under extra heavily loaded conditions, such as when a boat or house trailer is being drawn by the vehicle, the supplementary air spring, that is around the shock absorber can be pressurized with a suitable fluid under pressure, such as air, to provide an air spring unit that will yieldingly support or help support the added load and thereby aid the main suspension spring in the yielding support of the sprung mass on the unsprung mass of the vehicle.

Under conditions of operation of the vehicle wherein the supplementary air spring unit is not required to give any substantial aid to the main suspension spring of the vehicle, the supplementary air spring unit will operate in a deflated condition so that the flexible walls of which it is constructed tend to abrade one another in their movement of reciprocation with the reciprocal movement of the telescoping parts of the shock absorber. To conserve space, at least a part of the wall structure of the air spring unit is formed as a flexible tubular wall structure comprising inner and outer wall portions interconnected by a return bend portion, the inner and outer wall portions of the tubular wall section of the supplementary air spring unit tending to ride upon one another in the telescoping movement or reciprocating movement of the shock absorber parts. This abrading section between the flexible walls of the tubular wall portion of the air spring unit tends to reduce the life of the wall structure as well as cause the wall portion to bend over a much sharper radius in the return bend portion than when the air spring unit is being operated in an inflated condition.

It is therefore an object of this invention to provide an automotive vehicle suspension system incorporating a combination shock absorber and supplementary air spring unit assembly operating in parallel relation with the main suspension spring for support of the sprung mass on the unsprung mass of the vehicle and adjacent the main spring of the vehicle that includes controls to maintain a predetermined minimum inflation pressure within the supplementary air spring unit that is just sufficient to slightly inflate the portion of the air spring unit that is formed of the flexible tubular walls to prevent the flexible walls from engaging one another during reciprocal movement of the shock absorber parts and corresponding reciprocal movement of the air spring parts.

It is another object of the invention to provide an automotive vehicle suspension system in accordance with the foregoing object wherein the controls for the system include a control member that is manually operated to inflate the supplementary air spring unit and to deflate the same in accordance with the desire of the operator of the vehicle, but wherein there is also included an automatic control which cuts off the exhaust of fluid pressure from the air spring unit when a predetermined minimum pressure has been reached in the air spring unit during exhausting of the unit so that there will always be a predetermined minimum pressure retained in the supplementary air spring at all times.

Further objects and advantages of the present invention will be apparent from the following description, reference being had to the accompanying drawings wherein preferred embodiments of the present invention are clearly shown.

In the drawings:

FIGURE 1 is a schematic cross-sectional view of a vehicle incorporating a combination shock absorber and supplementary air spring unit assembly disposed adjacent each of the main suspension springs of the vehicle as located at the rear end of the vehicle adjacent the main springs and adjacent the axle, the air springs being connected with controls for controlling exhaust and supply of air to the air springs.

FIGURE 3 is a longitudinal cross-sectional view of a combination shock absorber and supplementary air spring unit assembly that is used in the automotive vehcile suspension system shown in FIGURES 1 and 2.

FIGURE 4 is a longitudinal cross-sectional view of a control valve incorporated in the supplementary air spring portion of the suspension system shown in FIGURES 1 and 2.

Figure 1:
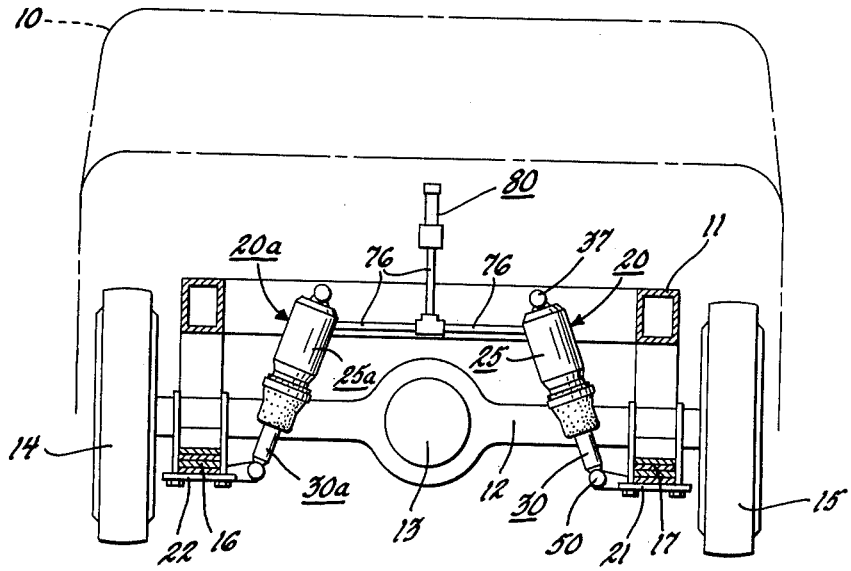
Figure 2:
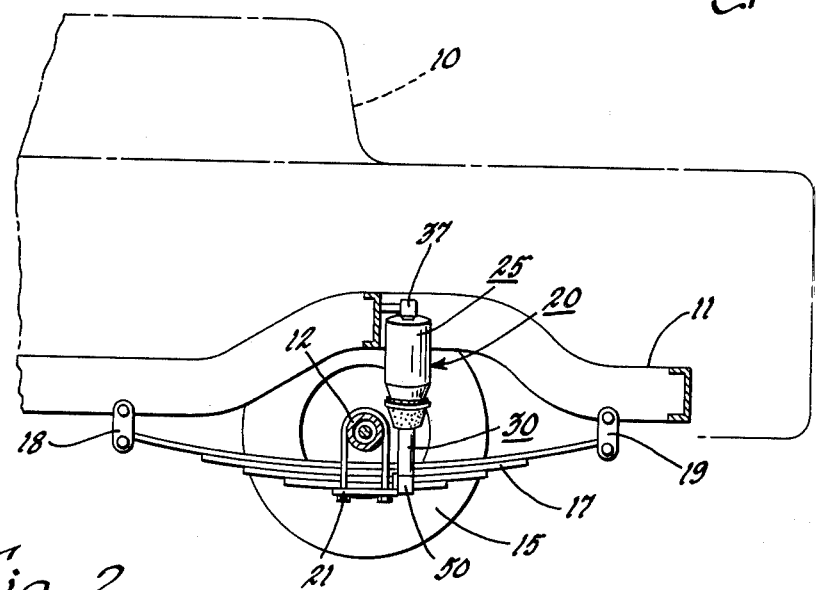
FIGURE 2 is a schematic longitudinal cross-sectional view of a vehicle illustrating the assembly shown in FIGURE 1.

In this invention, in FIGURES 1 and 2, there is illustrated schematically an automotive vehicle suspension system incorporating the features of this invention. The motor vehicle 10 has a chassis frame 11 that forms the sprung mass of the vehicle, together with the body of the vehicle, that is supported on the axle structure 12 having the differential 13 and the wheels 14 and 15 that are laterally spaced on the axle, the axle structure and the wheels forming the unsprung mass of the vehicle. The main suspension springs 16 and 17 are attached to the axle 12 in a conventional manner with the ends of the springs 16 and 17 each being connected with the chassis frame 11 by means of support shackles 18 and 19 placed at opposite ends of the leaf springs 16 and 17.

A combination shock absorber and supplementary air spring unit 20 is placed between the attachment support 21 for the spring 17 and the chassis 11, the combination shock absorber and air spring unit being disposed adjacent the main suspension spring 17 and being adapted to operate in parallel support relation effort to resiliently support the chassis 11 on the axle structure of the vehicle. A similar combination shock absorber and air spring unit 20a is located between the support bracket 22 for the spring 16 and the chassis 11 in the same manner as the unit 20. When the air spring units 25 and 25a are inflated in a manner hereinafter described, the air spring units aid support of the sprung mass or chassis 11 on the unsprung mass or axle structure 12 to prevent rear end sagging of the vehicle, the shock absorber of each of the combination units 20 and 20a functioning as a conventional direct-acting tubular type shock absorber.

The combination direct-acting tubular type shock absorber and air spring unit assembly is more particularly illustrated in FIGURE 3, each of the units 20 and 20a being of like structure, as shown in FIGURE 3.

As illustrated in FIGURE 3, the combination shock absorber and air spring unit assembly consists of a shock absorber 30 and the air spring unit 25 that is carried on the shock absorber. The shock absorber consists of a pressure cylinder 31 having a valved piston 32 that is carried on the end of a reciprocating rod 33. The reciprocating rod 33 extends through a rod guide member 34 at one end of the pressure cylinder 31, the rod guide member 34 having a rod seal chamber 35 that receives a rod seal 36 engaging the rod 33 and sealing against loss of hydraulic fluid from within the pressure cylinder 31. The projecting end of the rod 33 carries a fitting 37 that is adapted to be attached to the sprung mass or chassis 11 of the vehicle for attaching this end of the shock absorber to the vehicle. The seal chamber 35 is closed by a cap member 38 that also holds the rod seal 36 within the chamber 35, a compression spring 39 retaining resilient pressure on the seal member 36 to retain it in sealing engagement with the surface of the reciprocal rod 33.

The lower end of the pressure cylinder 31 is closed by a base valve structure 40 so that a compression chamber 41 is formed between the base valve 40 and the piston 32. A rebound chamber 42 is formed between the piston 32 and the rod guide 34 at the upper end of the pressure cylinder 31. The piston 32 is provided with a compression control valve 43 on one side of the piston to regulate flow of hydraulic fluid from the chamber 41 into the chamber 42 on movement of the piston 32 toward the base valve 40, excess fluid produced by the entry of rod 33 into the chamber 42 being displaced through the base valve 40 into the reservoir chamber around the pressure cylinder 31. On the opposite side of the piston 32 there is provided the rebound control valve 24 that regulates flow of hydraulic fluid from chamber 42 into chamber 41 when the piston moves upwardly away from the base valve 20, additional fluid for filling the chamber 41 being obtained from the reservoir through the base valve 40.

The base valve 40 is carried in a closure cap 45 that is secured within one end of a reservoir tube 46 surrounding and spaced from the pressure cylinder tube 31. The upper end of the reservoir tube 46 is fixedly attached to the clousrue cap 38, thereby providing a closed fluid reservoir space 47 between the pressure cylinder tube 31 and the reservoir tube 46. The base valve 40 has a valve member 48 that controls flow of hydraulic fluid from the compression chamber 41 into the reservoir chamber 47 on movement of the piston 32 toward the base valve 40. The base valve also includes a valve member 49 that provides for relatively free flow of hydraulic fluid from the reservoir chamber 47 back into the compression chamber 41 on movement of the piston 32 away from the base valve.

The closure cap 45 carries a fitting 50 that is adapted to attach the lower end of the shock absorber to the unsprung mass or axle structure 12 of the vehicle, the fitting members 50 and 37 thereby attaching the combination shock absorber and air spring unit assembly 20 and 20a between the sprung mass and the unsprung mass of the vehicle, in which condition the shock absorber 30 can function in conventional manner to provide for damping of relative movement between the sprung mass and the unsprung mass of the vehicle.

The air spring unit assembly 25 of the combination structure includes a tubular wall 51 that surrounds the reservoir tube 46 and is spaced from the tube and is coaxial with the axis of the shock absorber. The upper end of this tubular member 51 is secured to a cap member 52 that, in turn, is secured to the upper end 53 of the rod 33, the cap 52 and the tubular member 51 forming a chamber space 54 having an open end 55.

The open end 55 of the chamber space 54 is closed by a double-walled flexible tubular structure that includes an inner wall portion 61 and an outer wall portion 62 connected together by a return bend portion 63 integral with the wall portions 61 and 62, and is formed by these portions on relative reciprocation between the inner and the outer wall portions 61 and 62.

The inner wall portion 61 is sleeved onto the reservoir tube 46 and has a free end portion 64 that is attached to the rservoir tube 46 frictionally by an attaching sleeve 65.

The reservoir tube 46 has a cylindrical wall portion 66 coaxial with the axis of the shock absorber from the upper end of which there extends a wall portion 67 that has a diameter that diminishes continuously as the wall portion extends upwardly from the line X, the wall portion 67 being in the form of a truncated cone the base of which joins with the cylindrical wall portion at the line X. The wall portion 66 has a wall portion 68 extending downwardly therefrom that is of a diameter that increases continuously from the line Y to form a shoulder by the wall portion 68. The cylindrical sleeve 65 has the band portion 69 that extend coaxial with the wall portion 66 to retain the free end 64 of the inner wall 61 frictionally in engagement with the reservoir tube 46, the shoulder 68 preventing the sleeve 65 and the wall 61 from moving downwardly toward the base end of the shock absorber when fluid under pressure, such as air, is applied within the chamber space 54. The sleeve 65 extends substantially into engagement with the cap 52, as shown in FIGURE 3.

The outer wall portion of the flexible tubular wall structure has the free end 70 thereof attached to the lower end portion 71 of the tubular member 51 by a nonexpansible metal ring 72 which frictionally retains the wall end portion 70 in friction engagement with the wall portion 71. The wall portion 71 is in the form of a truncated cone so that fluid under presure applied within the chamber space 54 tending to urge the outer wall portion 62 downwardly will tighten the friction engagement of the end wall portion 70 with the wall portion 71.

The lower end of the wall portion 71 has an inwardly turned wall portion 75 that has its terminus end in close proximity to the inner wall 61 of the flexible tubular wall structure when the shock absorber is in complete collapsed position as shown in FIGURE 3 so that when the wall member 51 reciprocates relative to the reservoir tube 46, on reciprocation of the rod 33, the outer wall portion 62 will not tend to turn inwardly into the chamber space 54 and thereby become bound between the lower end of the tubular member 51 and the inner wall 61 or the guide wall 65 that is provided at the upper end of the shock absorber. A conduit connection 76 is provided in the tubular wall 51 through which fluid under pressure is supplied into chamber space 54 and through which pressure fluid is exhausted from the chamber space 54 under control of suitable valving herein after described.

From the foregoing description it will be apparent that the shock absorber 30 of the combination shock absorber and air spring unit can function in conventional manner as a shock absorber when the air spring unit is deflated, or depressurized, and when the air spring unit receives fluid under pressure, such as air, the air spring unit will aid the main springs 16 and 17 in resilient support of the sprung mass on the unsprung mass of the vehicle, the shock absorber still retaining its normal function.

From the foregoing description it will be apparent that when the air spring unit 25 is operated in a deflated or depressurized condition, that is when the air pressure in the chamber space 54 is at atmosphere, or less than atmosphere, the outer flexible wall 62 will engage the inner wall portion 61 of the flexible tubular wall structure so that the wall surfaces rub against one another during reciprocal movement between the wall portions 61 and 62. Also, it will be apparent that if the walls 61 and 62 are in engagement, the radius of curvature of the return bend portion 63 will be extremely small, which produces undue stresses in the wall structure in the return bend portion 63. Both of these features tend to reduce the life of the resilient flexible tubular wall structure comprised of the walls 61 and 62.

In this invention therefore there is provided a control which allows for manually controlled or actuated inflation or deflation of the pressure chamber 54 of the air spring unit, but which prevents the depressurization of the chamber 54 below a predetermined minimum pressure value, at which, just sufficient fluid pressure is retained in the chamber 54 to maintain the walls 62 and 61 of the flexible tubular wall structure out of physical engagement during the reciprocation of the wall structure, which follows the reciprocation of the shock absorber. Since the walls 61 and 62 will not be in engagement with one another, abrasion of the wall by rubbing contact will be eliminated. Also, since there will be a small amount of inflation pressure retained in the chamber 54, the radius of curvature of the return bend 63 will not be so sharp and therefore will relieve the flexing stresses in the return bend portion.

The device is illustrated in FIGURE 3 in a condition in which a predetermined minimum inflation pressure is retained in the chamber 54, the flexible walls 61 and 62 being shown out of engagement.

A control device to provide for manually actuated inflation or deflation of the air spring unit and to provide for control of the minimum pressure value to be residually retained in the chamber 54 is more particularly illustrated in FIGURE 4.

The control device illustrated in FIGURE 4 consists of a valve body 80 having an internal chamber 81 provided with a port 82 at one end thereof and a port 83 at the opposite end. The port 83 carries a fitting 84 that connects with the tube 76 for supplying fluid under pressure to the chamber space 54 of the combination shock absorber and air spring unit and through which fluid under pressure is exhausted from the chamber space 54.

The inlet port 82 is supplied with a manually operated or actuated inlet and exhaust control valve 85 that may be in the form of a conventional tire valve. The valve 85 consists of a threaded body 86 received in the threaded bore 87 in the port 82. The body 86 carries a sleeve member 88 that, in turn, carries a seal member 89 adapted to seat in the port opening 90 when the valve body 86 is threaded into the position shown in FIGURE 4. A valve stem 91 extends through the valve body 86 and the sleeve 88 and has a valve element 92 on the lower end thereof engaging the valve seat 93 to close the internal port 94 through the valve 85. The valve stem 91 holds the valve element 92 on its seat 93 by the engagement of the spring 95 between the lower end of the sleeve 88 and the enlarged head 96 on the valve stem. A sealing cap 97 is threadedly received on the upper end of the body of the valve 80, by the threaded portion 98, to sealingly close the port 82 when the cap 97 is in the position illustrated in FIGURE 4.

Obviously, when the suitable nozzle is applied to the upper end of the valve body 80, air under pressure or other suitable gas under pressure from a suitable pressure source, conducted through the nozzle that is applied to the end of the valve body, will cause the valve stem 91 to move downwardly to move the valve element 92 away from its valve seat and allow fluid under pressure to enter into the chamber 81. Similarly, when the valve stem is manually pushed downwardly, the fluid under pressure in chamber 81 can be exhausted back through the valve 85 therefore being and functioning like a conventional tire valve.

The chamber 81 in the valve body 80 includes an enlarged chamber portion 100 that receives a valve member 101 that forms an automatically operating residual pressure control valve for shutting off exhaust of pressurized fluid from the chamber space 54 when fluid pressure in the chamber space 54 reaches a predetermined minimum value.

The valve member 101 has a resilient rubber-like disk 102 on the bottom face thereof, the disk being provided with a central opening 103. The bottom wall 104 of the valve element 101 is provided with a plurality of ports 105 that are out of alignment with the central opening 103 in the rubber-like valve disk 102. The rubber-like valve disk 102 is retained on a valve seat 106 by means of a compression spring 107. The valve seat 106 provides a central chamber 108 that communicates with the fluid flow port 83 and thereby the conduit 76 that connects with the chamber space 54 of the air spring unit 25.

Normally, the valve element 101 retains the rubber-like valve disk 102 on its seat 106 in the position shown in FIGURE 4 regardless of whether the chamber space 54 of the air spring 25 is pressurized or depressurized. The conduit 76 is in fluid flow communication with the chamber space 81 of the valve 80 when fluid under pressure is being supplied to the chamber space 54 since the valve 92 will be lifted from its seat 93 and the air under pressure can flow from the chamber 81 down through the openings 105 and the valve element 101 to deflect the rubber-like valve member 102 downwardly with the result that the fluid under pressure flows through the central opening 103 into the conduit 76 for supply to the chamber space 54 of the air spring so long as the fluid pressure source, or air pressure source, is connected with the air spring. The degree or value of air pressure or fluid pressure supplied into the chamber space 64 is therefore under control of manual actuation of the operator and the maximum air pressure or fluid pressure available at the source of supply. The operator of the vehicle can visually determine when sufficient air pressure has been supplied into the pressure chamber 54 by inspecting the level condition of the vehicle relative to the road.

When it is desired to deflate the air spring unit 25, the operator of the vehicle can manually move the valve stem 91 downwardly to move the valve element 92 from its seat and thereby open the passage for exhaust of fluid under pressure from the conduit 76. This will be as uncontrolled exhaust of fluid pressure from the chamber space 54 except as for the manual control of the operator, and except for the automatic operation of the residual pressure control valve 101.

So long as the fluid pressure in the conduit 76 is greater than the effect of the compression spring 107, the valve element 102 will be lifted from its seat 106 whenever the valve stem 91 is moved inwardly to open valve element 92. This will allow free and uncontrolled exhaust of fluid under pressure from the pressurizing chamber 54 of the air spring unit 25 until the fluid pressure in the chamber 54 and therefore in the conduit 76 falls to a predetermined low value equal to the effect of the compression spring 107 on the valve element 101. At this time the valve element 101 will seat the valve disk 102 on the seat 106 and thereby prevent further depressurization of the air chamber space 34 of the air spring unit 25 and thereafter retain a residual fluid pressure in the chamber space 54 that is sufficient to prevent the outer wall 62 and the inner wall 61 of the flexible tubular wall structure from engaging one another or preventing the wall 62 from engaging the guide wall 65 during the reciprocation of the flexible tubular wall structure relative to the shock absorber 30. Obviously, whenever the cap 97 is placed upon the body of the valve 80, the system will be sealed so that once the minimum pressure value has been established in the chamber 54, assuming no further leakage in the system, the established minimum pressure will thereafter be retained in the chamber 54. It has been determined experimentally that a pressure value of approximately 10 lbs. per square inch is sufficient in the pressurizing chamber 54 of the air spring unit 25 to maintain sufficient inflation in the air spring unit 25 to prevent engagement of the walls 61 and 62 in the normal reciprocal movement of the shock absorber, and that this low pressure value retained in the chamber 54 does not have any substantial effect on the spring effect of the main springs 16 and 17 of the vehicle so that the normally engineered ride effect of the springs 16 and 17 is not upset by the low air pressure value that is retained as residual pressure in the chamber 54 of the air spring units 25.

While the embodiments of the present invention as herein disclosed constitute preferred forms, it is to be understood that other forms might be adopted.

What is claimed is as follows:

1. A valve for controlling flow of fluid under pressure and exhaust of fluid under pressure respectively to and from an air spring and for retaining in the air spring a residual fluid pressure of a predetermined minimum value, said valve comprising, a tubular valve body having an imperforate outer diameter forming an internal chamber, said tubular body having a first open end and a second open end in communication with said internal chamber, first valve means in one end of said tubular body including a valve element and first spring means for urging said valving element into a position for closing one of said end openings and operable manually to open said one open end for pressure fluid flow in either direction through said internal chamber, and a second valve means in the opposite end of said tubular body for controlling pressure fluid flow through the other open end of said valve body, said second valve means including second spring means and a valving element having one position for allowing pressurized fluid flow from said internal chamber through said other open end to a pressurizable chamber, said valving element having a second position for allowing exhaust of pressurized fluid from the pressurizable chamber into said internal chamber and a third position closing said other open end against exhaust of pressurized fluid flow from the pressurizable chamber into the internal chamber upon the occurrence of the predetermined minimum pressure value in the pressurizable chamber.

2. A valve for controlling flow of fluid under pressure and exhaust of fluid under pressure respectively to and from a pressurizable chamber and for retaining a residual pressure of a predetermined minimum value in the chamber upon exhaust flow of fluid therefrom, said valve comprising, a tubular valve body having an imperforate outer diameter forming an internal chamber, said valve body having an opening through either end thereof in communication with said internal chamber, valve means in said tubular body at one end thereof including means urged to a first position for closing the opening through one end of said tubular body and operable manually to an open position for allowing pressure fluid flow in either direction through the opening at said one end of said valve body to and from said internal chamber, and a second valve means in said tubular body at the opposite end thereof for controlling pressure fluid flow through the opening at the other end of said tubular body, said second valve means including a first valve member urged resiliently to close said other end opening against pressure fluid flow from said internal chamber to a pressurizable chamber and to open said other end opening for exhaust flow of pressurized flow from the pressurizable chamber to said internal chamber, said second valve means having a wall provided with passageway means therethrough for fluidly connecting said internal chamber with the second end opening and including a resilient valving member on said wall for closing said passageway means against exhaust of pressurized fluid flow from said other end opening into said internal chamber while opening said passageway means for flow of pressurized fluid from said internal chamber to said other end opening.

3. A valve for controlling flow of fluid under pressure and exhaust of fluid under pressure respectively to and from an air spring and for retaining in the air spring a residual fluid pressure at a predetermined minimum value, said valve comprising, a tubular valve body having an imperforate outer diameter forming an internal chamber, said tubular body having a first and second open end in communication with said internal chamber, valve means in one end of said tubular body including a spring and a valve element spring urged thereby to a position for allowing pressure fluid flow in either direction through said one open end to and from said internal chamber so long as the valve means is held open against the spring pressure urging the same to a closed position, and a second valve means closing the other of said open ends, said second valve means including a spring and a body member having a flexible valve disk on one wall thereof with the said body member having ports through the said one wall for flow of fluid pressure in one direction through the said body member outwardly of said internal chamber through the other open end of said valve body, said valve disk being flexed away from the said wall for the pressure fluid flow from said internal chamber through said other open end, a valve seat in said other open end, said flexible valve disk being normally urged against said valve seat by spring pressure applied to the body member of said valve means, said valve disk having an opening therein misaligned with the ports in said one wall to provide for the aforesaid flow of pressure fluid through said valve means, said body member and the flexible valve disk carried thereby being raised from said seat by pressure flow from said other open end to said internal chamber in the opposite direction until pressure of the fluid flowing in the said opposite direction reaches a predetermined minimum value at which said spring of the valve means urges said valve disk against said seat to close the said other open end against further fluid flow to said internal chamber.

References Cited by the Examiner

UNITED STATES PATENTS

| | | | |
|---|---|---|---|
| 1,120,088 | 12/14 | Saam | 137—614.2 XR |
| 2,133,575 | 10/38 | Rosenberg | 137—493.2 |
| 2,147,084 | 2/39 | Bouchard | 137—614.19 XR |
| 2,789,578 | 4/51 | Goepfrich | 137—493.1 |
| 2,954,796 | 10/60 | Marshall | 137—226 |

LAVERNE D. GEIGER, *Primary Examiner.*

ISADOR WEIL, *Examiner.*